US008228322B2

(12) United States Patent
Cheng et al.

(10) Patent No.: US 8,228,322 B2
(45) Date of Patent: Jul. 24, 2012

(54) METHOD AND SYSTEM OF CONTROLLING HALT AND RESUME OF SCANNING AN LCD

(75) Inventors: Pu-Jen Cheng, Tainan (TW); Chih-CHeng Chen, Tainan (TW)

(73) Assignee: Himax Technologies Limited, Tainan (TW)

( * ) Notice: Subject to any disclaimer, the term of this patent is extended or adjusted under 35 U.S.C. 154(b) by 360 days.

(21) Appl. No.: 12/612,294

(22) Filed: Nov. 4, 2009

(65) Prior Publication Data

US 2011/0102394 A1 May 5, 2011

(51) Int. Cl.
*G06F 3/038* (2006.01)

(52) U.S. Cl. ......................... 345/208; 348/206; 348/264

(58) Field of Classification Search ........... 345/208–213
See application file for complete search history.

(56) References Cited

U.S. PATENT DOCUMENTS

| | | | | |
|---|---|---|---|---|
| 6,084,562 | A * | 7/2000 | Onda | 345/94 |
| 6,469,684 | B1 * | 10/2002 | Cole | 345/58 |

* cited by examiner

*Primary Examiner* — Alexander S Beck
*Assistant Examiner* — Charles Zheng
(74) *Attorney, Agent, or Firm* — Stout, Uxa, Buyan & Mullins, LLP

(57) ABSTRACT

A method and system of controlling halt and resumption of scanning actions of an LCD is disclosed. An incoming video source is monitored, and current scan line position and corresponding polarity are recorded. When an abnormal video source is detected, the LCD scanning is stopped at a halt scan line of a halt frame with a halt polarity. After a normal video source has been detected again, determination is made of a proper resumptive scan line and/or a resumptive polarity. The panel scanning is resumed at the resumptive scan line equal to the halt scan line and/or with the resumptive polarity matching the halt polarity.

18 Claims, 4 Drawing Sheets

METHOD AND SYSTEM OF CONTROLLING HALT AND RESUME OF SCANNING AN LCD

BACKGROUND OF THE INVENTION

1. Field of the Invention

The present invention generally relates to a liquid crystal display (LCD), and more particularly to a system and method of controlling halt and resumption of scanning actions of an LCD.

2. Description of Related Art

Liquid crystal display (LCD) technology has been widely used in television sets and a variety of other electronic devices. According to specific characteristics of liquid crystal molecules, a polarity inversion scheme is commonly applied to change the direction of electric field at regular intervals such as frame, column, row or dot, such that the polarity of the electric field changes every frame, column, row or dot. FIG. 1 shows two neighboring frames for which row inversion scheme is utilized. In frame N, the polarity of the first row is positive "+", and the polarity of the second row is changed to negative "−", and so on. In frame N+1, however, the polarity of the first row is negative "−", which is the inverse of the polarity of the same row in the preceding frame N.

Television broadcasting, and electrical communication in general, is commonly subject to noise or disturbance. An LCD television set that receives such noise may cause annoyance to viewers. FIG. 2 shows an example in which frame N suffers noise beginning at the fourth row, and therefore display of the remaining rows is stopped. After recovering from the interruption, frame N+1 starts the display from the first row. It is noted that the last display row (i.e., the third row) in frame N and the continuing row (i.e., the fourth row) in frame N+1 has the same polarity "+". Consequently, this situation, as indicated by the arrow in the figure, may cause flicker to viewers.

For the reason that conventional LCDs cannot effectively recover from an inevitable interruption caused, for example, by noise, a need has arisen to propose a novel scheme that may avoid flicker or other annoyance induced during the recovery from display interruption.

SUMMARY OF THE INVENTION

In view of the foregoing, it is an object of the embodiment of the present invention to provide a system and method of controlling halt and resumption of scanning actions of an LCD in order to make the recovery from a display interruption smoother or more continuous with less or no flicker.

According to one embodiment, an incoming video source is monitored to detect abnormality of the video source, and current scan line position and corresponding polarity are recorded. The panel scanning of the LCD is stopped when an abnormality of the video source is detected, wherein the scan line for which the panel begins to stop scanning is defined as a halt scan line, its corresponding polarity is defined as a halt polarity, and its associated frame is defined as a halt frame. After a normal video source has been detected again, determination is made of one or both of the following parameters: a resumptive scan line that has a position equal to that of the halt scan line with respect to a first pixel of respective frame; and a resumptive polarity such that a resumptive frame has the same polarity as the halt frame. The panel scanning is then resumed on one or both of the following conditions: at the resumptive scan line; and when the polarity of the resumptive frame matches the polarity of the halt frame.

DETAILED DESCRIPTION OF THE INVENTION

Figure 1:
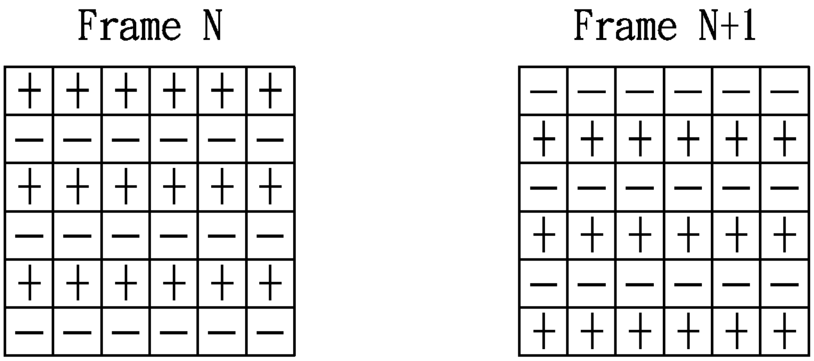
FIG. 1 (PRIOR ART)
FIG. 1 shows two neighboring frames for which row inversion scheme is utilized.
Figure 2:
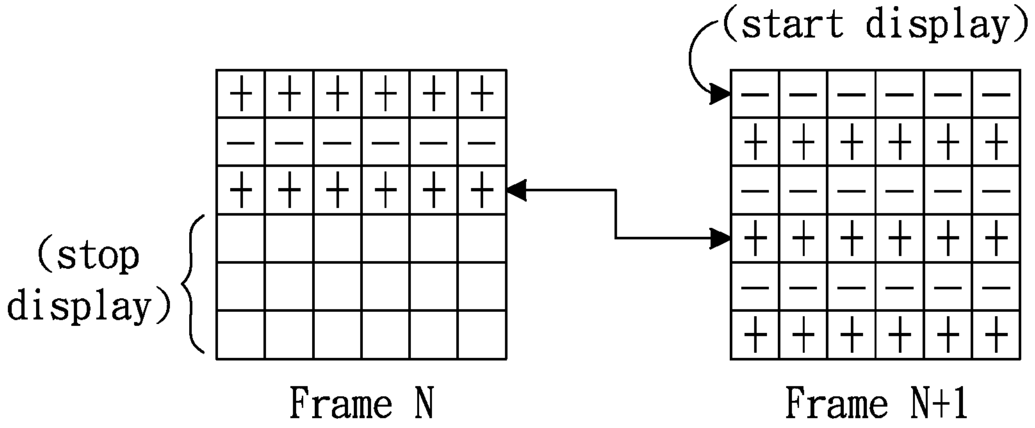
FIG. 2 (PRIOR ART)
FIG. 2 shows an example in which frame N suffers noise and frame N+1 recovers from the interruption caused by the noise.
Figure 3:
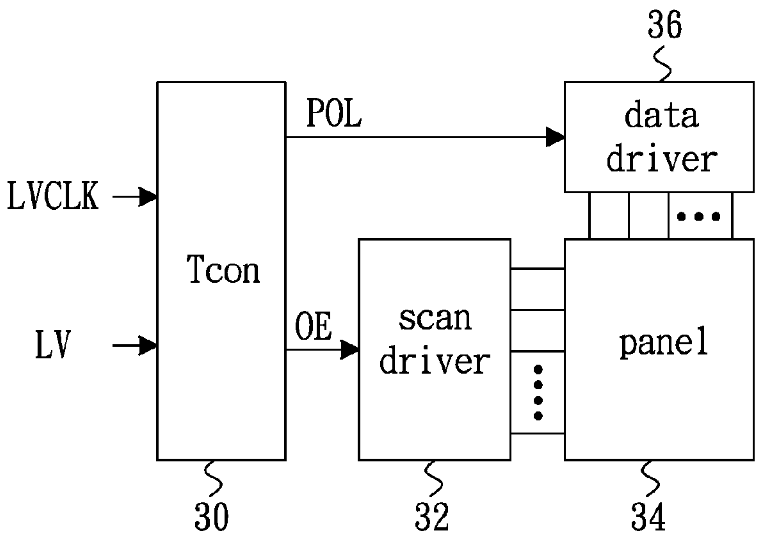
FIG. 3 shows a functional block diagram of a liquid crystal display (LCD)

FIG. 3 shows a functional block diagram of a liquid crystal display (LCD). A timing controller (Tcon) 30 receives, among others, a video source such as a low-voltage differential signaling (LVDS) video signal LV, and a corresponding video clock LVCLK. The timing controller 30 generates an output enable signal OE to a scan driver (or gate driver) 32. When the output enable signal OE is assertive (e.g., "0"), the scan driver 32 scans rows of pixels of an LCD panel 34 in sequence; and when the output enable signal OE is de-assertive (e.g., "1"), the scan driver 32 stops scanning the panel 34. The timing controller 30 also generates a polarity inversion signal POL to a data driver (or source driver) 36 such that the video data out of the data driver 36 may have appropriate voltage potential in compliance with the polarity of associated pixels.

Figure 4:
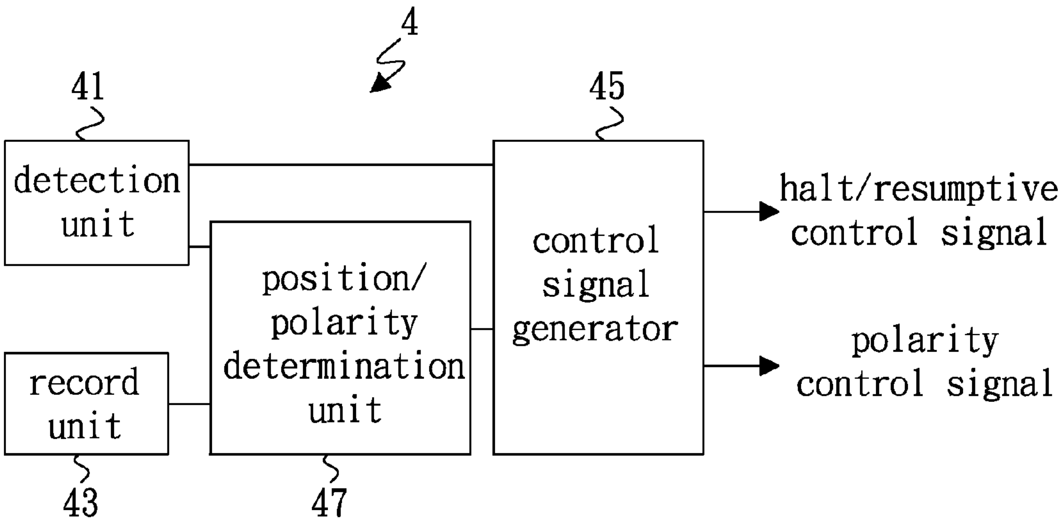
FIG. 4 shows a functional block diagram that illustrates a system of controlling halt and resumption of scanning actions of an LCD.
Figure 5:
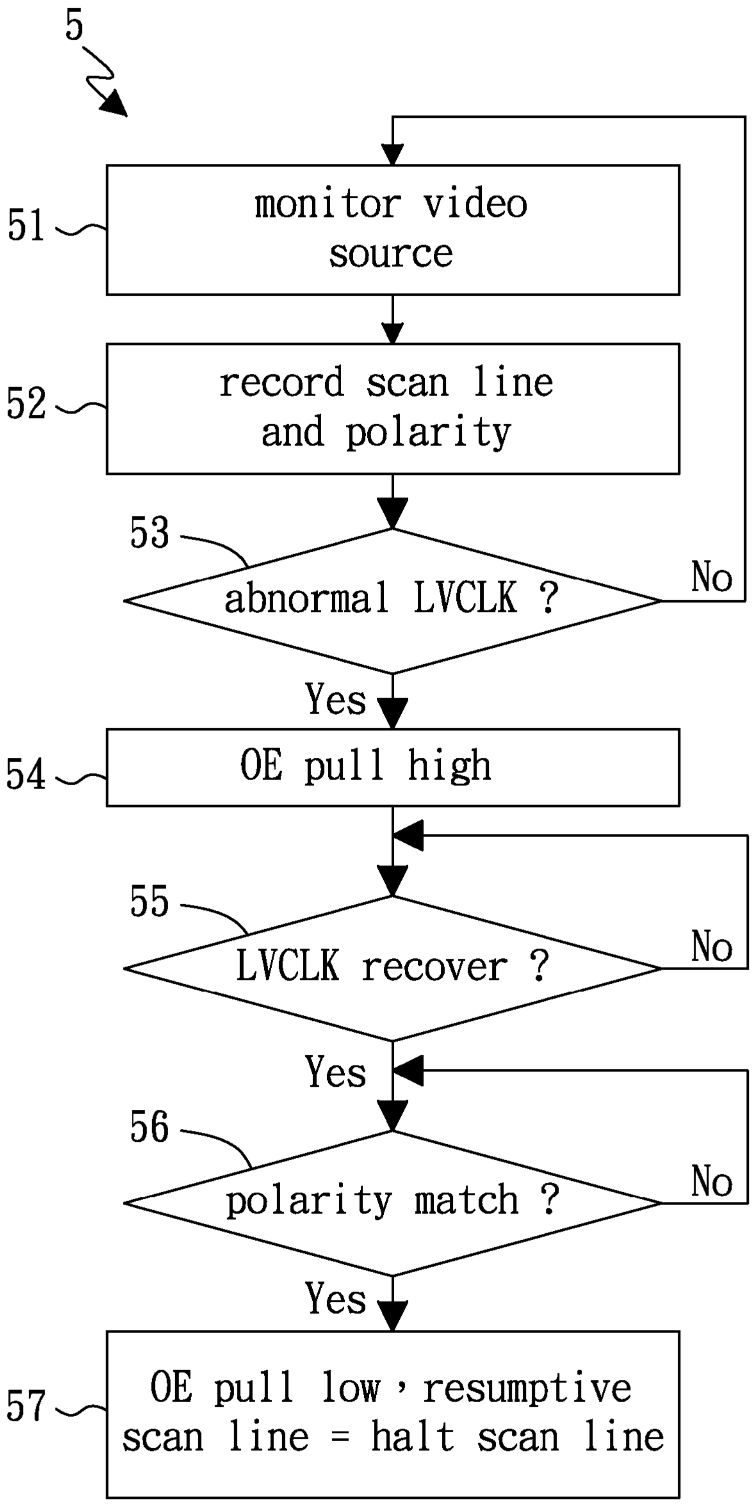
FIG. 5 shows a flow diagram that illustrates a method of controlling halt and resumption of scanning actions of an LCD.

FIG. 4 shows a functional block diagram that illustrates a system 4 of controlling halt and resumption of scanning actions of an LCD, such as the LCD shown in FIG. 3. FIG. 5 shows a flow diagram 5 that illustrates a method of controlling halt and resumption of scanning actions of an LCD.

In the embodiment, the system 4 may be implemented within the timing controller 30 of FIG. 3. A detection unit 41 monitors the incoming video source to detect any abnormality of the video source (step 51). Specifically, in the embodiment, the detection unit 41 monitors the video clock LVCLK to determine whether the frequency of the video clock LVCLK is within limits that define the range of a normal video clock LVCLK. An abnormal video clock LVCLK may indicate that the video signal LV is being affected by noise or disturbance.

Concurrently with the monitoring, a record unit 43 continuously or regularly records current scan line position and corresponding polarity (step 52). For example, with respect to a line inversion scheme, the current scan line position (or number) and its corresponding polarity are recorded.

When the detection unit 41 detects abnormality of the incoming video clock LVCLK (step 53), a control signal generator 45 accordingly generates (e.g., via an output) a halt/resumptive control signal, which is then used to de-assert (or pull-high) the output enable signal OE in order to stop scanning of the panel 34 (step 54). Accordingly, the display scan is halted. At the same time, the halt scan line is peculiarly recorded by the record unit 43. In other words, the scan line for which the panel 34 begins to stop displaying is peculiarly marked as the halt scan line. Moreover, a halt polarity associated with the halt scan line or associated with the first pixel of the halt frame is also recorded.

Figure 6A:
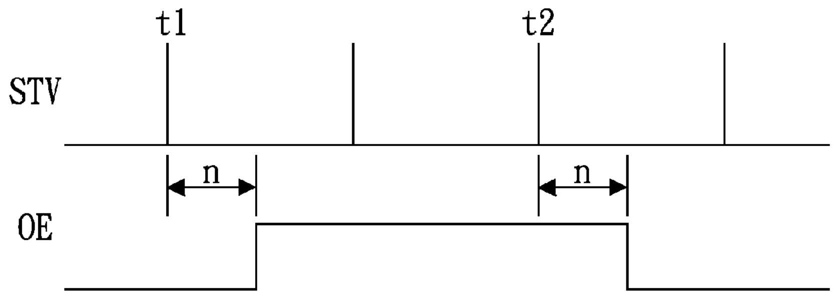
FIG. 6A shows an exemplary timing diagram that illustrates a start signal STV and the output enable signal OE according to one embodiment of the present invention.
Figure 6B:
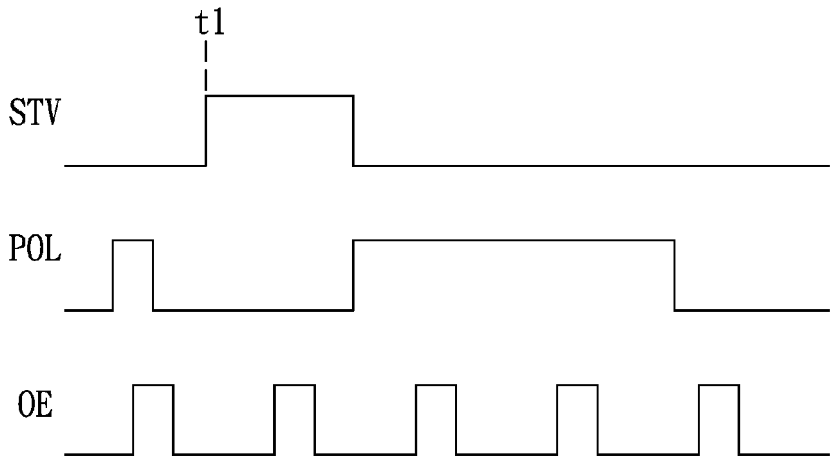
FIG. 6B shows an expanded timing diagram that illustrates the start signal STV, the output enable signal OE, and the polarity inversion signal POL at about the time t1 of FIG. 6A.

FIG. 6A shows an exemplary timing diagram that illustrates a start signal STV and the output enable signal OE according to one embodiment of the present invention. The start signal STV, which is usually derived from a vertical synchronization signal, indicates the start of a frame. In this timing diagram, the output enable signal OE is completely pulled high because of noise interruption at the n-th scan line of the halt frame beginning at t1. In other words, the halt scan line is the n-th line in the example. FIG. 6B shows an expanded timing diagram that illustrates the start signal STV, the output enable signal OE, and the polarity inversion signal POL around (e.g., at about) the time t1 of FIG. 6A. According to the exemplary timing diagram of FIG. 6B, the halt polarity associated with the first pixel of the frame is negative "–".

Afterward, when the detection unit 41 detects the recovery of the incoming video clock LVCLK (step 55), a position/polarity determination unit 47 accordingly determines an appropriate position (or scan line) and polarity to resume scanning the panel 34. In the embodiment, the position/polarity determination unit 47 maintains the halt status until a resumptive polarity of a frame is matched (or the same as) the halt polarity (step 56). Upon matching the polarity, the output enable signal OE is asserted (or pulled low), and the scan resumes at a resumptive scan line that is equal to (or the same as) the halt scan line (step 57). At that time, the control signal generator 45 generates a polarity control signal, for example, to the timing controller 30 in order to output a proper polarity inversion signal POL to the data driver 36. According to another embodiment, instead of waiting for the polarity to be matched, the polarity of the electric field is forced to be the resumptive polarity at the resumptive scan line.

Figure 6C:
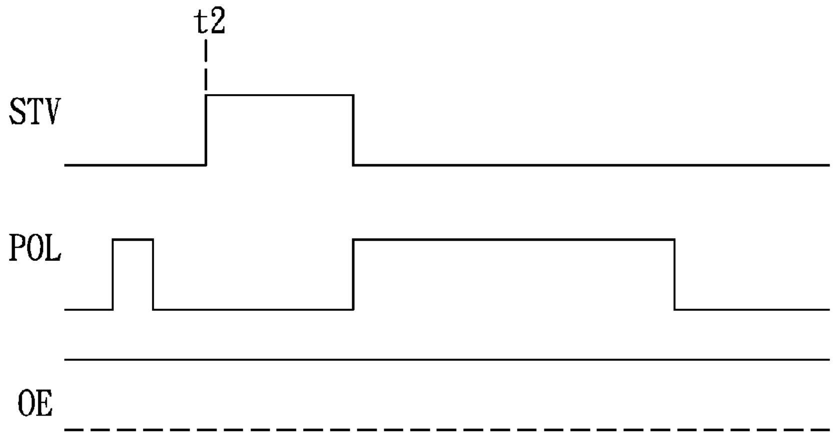
FIG. 6C shows an expanded timing diagram that illustrates the start signal STV, the output enable signal OE, and the polarity inversion signal POL at about the time t2 of FIG. 6A.

Referring to FIG. 6A, after the polarity matching, the output enable signal OE is pulled low at the n-th scan line of the resumptive frame beginning at t2. In other words, the resumptive scan line is the n-th line, which is equal to the halt scan line. FIG. 6C shows an expanded timing diagram that illustrates the start signal STV, the output enable signal OE, and the polarity inversion signal POL around (e.g., at about) the time t2 of FIG. 6A. According to the exemplary timing diagram of FIG. 6C, the resumptive polarity associated with the first pixel of the frame is negative "–".

According to the embodiment described above, the resumptive scan line may thus resume scanning of the panel 34 in a smooth manner by starting the resumptive scan line exactly at the halt scan line. In addition to the same position, the polarity of the resumptive scan line may thus be the same as the polarity of the halt scan line. Accordingly, flicker or other annoyance induced during the conventional recovery from the display interruption may be avoided, thereby improving the quality of video display.

According to another embodiment of the present invention, a polarity determination unit is used instead of the position/polarity determination unit 47 (FIG. 4). In the present embodiment, the recording of the halt scan line and the determination of the resumptive scan line are not necessary. Upon matching the polarity (step 56), the scan resumes at the first scan line (rather than the resumptive scan line as in the previous embodiment) of the resumptive frame.

According to a further embodiment, a position determination unit is used instead of the position/polarity determination unit 47 (FIG. 4). In the present embodiment, the recording of the halt polarity and the determination of the resumptive polarity are not necessary. When the detection unit 41 detects the recovery of the incoming video clock LVCLK (step 55), the scan resumes, for example in the current frame or next frame, at a resumptive scan line that is equal to (or the same as) the halt scan line (step 57).

Although specific embodiments have been illustrated and described, it will be appreciated by those skilled in the art that various modifications may be made without departing from the scope of the present invention, which is intended to be limited solely by the appended claims.

What is claimed is:

1. A method of controlling halt and resumption of scanning actions of an LCD, comprising:

monitoring an incoming video source to detect abnormality of the video source;

recording current scan line position and corresponding polarity;

stopping scanning of a panel of the LCD when the abnormality of the video source is detected, wherein the scan line for which the panel begins to stop scanning is defined as a halt scan line, its corresponding polarity is defined as a halt polarity, and its associated frame is defined as a halt frame;

after a normal video source has been detected again, determining one or both of the following parameters: a resumptive scan line that has a position equal to that of the halt scan line with respect to a first pixel of respective frame; and a resumptive polarity such that a resumptive frame has the same polarity as the halt frame; and resuming the panel scanning on one or both of the following conditions: at the resumptive scan line; and when the polarity of the resumptive frame matches the polarity of the halt frame;

wherein the panel scanning is stopped by de-asserting an output enable signal inputting to a scan driver of the LCD only when the abnormality of the video source is detected.

2. The method of claim 1, wherein the method is performed on the video source comprising a video clock.

3. The method of claim 2, wherein a determination is made as to whether the frequency of the video clock is determined within limits that define a range of a normal video clock.

4. The method of claim 1, wherein the panel scanning is resumed by asserting the output enable signal.

5. The method of claim 1, wherein the polarity of the resumptive frame matches the polarity of the halt frame by forcing polarity of electric field in the panel.

6. The method of claim 1, wherein the polarity of the scan line is determined by a polarity inversion signal inputting to a data driver of the LCD.

7. The method of claim 1, when the panel scanning is resumed not at the resumptive scan line, the resumptive frame is then resumed at its first scan line.

8. The method of claim 1, wherein the halt polarity of the halt frame is defined as the polarity of a first pixel of either the halt scan line or the first scan line.

9. The method of claim 1, wherein the first pixel of the frame is defined by a start signal which is derived from a vertical synchronization signal associated with the video source.

10. A system of controlling halt and resumption of scanning actions of an LCD, comprising:

a detection unit coupled to receive and monitor an incoming video source to detect abnormality of the video source, such that scanning a panel of the LCD may be stopped when the abnormality of the video source is detected;

a record unit formed to record current scan line position and corresponding polarity, wherein the scan line for which the panel begins to stop scanning is defined as a halt scan line, its corresponding polarity is defined as a halt polarity, and its associated frame is defined as a halt frame;

a position/polarity determination unit having an arrangement such that, after a normal video source has been detected again, it determines one or both of the following parameters: a resumptive scan line that has a position equal to that of the halt scan line with respect to a first pixel of respective frame; and a resumptive polarity such that a resumptive frame has the same polarity as the halt frame; and a control signal generator configured with an output that, according to results of the detection unit and the position/polarity determination unit, generates control signals in order to resume the panel scanning on one or both of the following conditions: at the resumptive scan line; and when the polarity of the resumptive frame matches the polarity of the halt frame;

wherein the system is configured to stop panel scanning according to the generated control signal which accordingly de-asserts an output enable signal input to a scan driver of the LCD only when the abnormality of the video source is detected.

11. The system of claim 10, wherein the video source comprises a video clock.

12. The system of claim 11, wherein the detection unit is configured to determine whether frequency of the video clock is within limits that define a range of a normal video clock.

13. The system of claim 10, the system being configured to resume panel scanning according to the generated control signal which accordingly asserts the output enable signal.

14. The system of claim 10, wherein the polarity of the resumptive frame matches the polarity of the halt frame by forcing polarity of electric field in the panel.

15. The system of claim 10, wherein a data driver of the LCD is coupled to input a polarity inversion signal which determines the polarity of the scan line.

16. The system of claim 10, when the panel scanning is resumed not at the resumptive scan line, the system is configured to resume the resumptive frame at its first scan line.

17. The system of claim 10, wherein the halt polarity of the halt frame is defined as the polarity of a first pixel of either the halt scan line or the first scan line.

18. The system of claim 10, wherein the first pixel of the frame is defined by a start signal which is derived from a vertical synchronization signal associated with the video source.

* * * * *